US008693831B2

(12) United States Patent  (10) Patent No.: US 8,693,831 B2
Register, III et al.  (45) Date of Patent: Apr. 8, 2014

(54) FIBER OPTIC CABLES ALLOWING FIBER TRANSLATION TO REDUCE BEND ATTENUATION

(75) Inventors: James A. Register, III, Hickory, NC (US); Reginald Roberts, Taylorsville, NC (US); Randall D. Tuttle, Connelly Springs, NC (US)

(73) Assignee: Corning Cable Systems LLC, Hickory, NC (US)

( * ) Notice: Subject to any disclaimer, the term of this patent is extended or adjusted under 35 U.S.C. 154(b) by 89 days.

(21) Appl. No.: 13/489,867

(22) Filed: Jun. 6, 2012

(65) Prior Publication Data

US 2012/0315004 A1   Dec. 13, 2012

Related U.S. Application Data

(60) Provisional application No. 61/588,950, filed on Jan. 20, 2012, provisional application No. 61/495,732, filed on Jun. 10, 2011.

(51) Int. Cl.
 *G02B 6/44* (2006.01)
(52) U.S. Cl.
 CPC ............ *G02B 6/4433* (2013.01); *G02B 6/44* (2013.01); *G02B 6/4401* (2013.01); *G02B 6/4429* (2013.01)
 USPC ............ 385/113; 385/101; 385/109; 385/110
(58) Field of Classification Search
 CPC ...... G02B 6/44; G02B 6/4401; G02B 6/4429; G02B 6/4433
 USPC ................................. 385/101, 109, 110, 113
 See application file for complete search history.

(56) References Cited

U.S. PATENT DOCUMENTS

| 4,038,489 | A |   | 7/1977  | Stenson et al. |
| 4,172,106 | A |   | 10/1979 | Lewis |
| 4,525,702 | A | * | 6/1985  | Kitagawa et al. ............. 340/556 |
| 4,984,869 | A |   | 1/1991  | Roche |
| 5,050,957 | A |   | 9/1991  | Hamilton et al. |
| 5,138,685 | A |   | 8/1992  | Arroyo et al. |
| 5,163,116 | A |   | 11/1992 | Oestreich et al. ............. 385/111 |
| 5,319,730 | A |   | 6/1994  | Rasanen et al. |
| 5,469,523 | A |   | 11/1995 | Blew et al. |

(Continued)

FOREIGN PATENT DOCUMENTS

AU      740507 B2    2/1999
DE    19628457 A1    1/1998

(Continued)

OTHER PUBLICATIONS

Raymer et al., "Spontaneous Knotting of an agitated string," PNAS, vol. 104, No. 42, The National Academy of Sciences of the USA, Oct. 16, 2007, pp. 16432-16437.

(Continued)

*Primary Examiner* — Ryan Lepisto
(74) *Attorney, Agent, or Firm* — Russell S. Magaziner

(57) ABSTRACT

A cable includes a channel with an aspect ratio that houses optical fibers therein. The cable includes first and second stranded conductors on opposing sides of the channel. The channel is arranged with respect to the stranded conductors so that the fibers assume low strain positions in the channel when the cable is bent.

20 Claims, 9 Drawing Sheets

(56) References Cited

U.S. PATENT DOCUMENTS

| | | | |
|---|---|---|---|
| 5,509,097 | A | 4/1996 | Tondi-Resta et al. |
| 5,542,020 | A | 7/1996 | Horska |
| 5,651,081 | A | 7/1997 | Blew et al. |
| 5,668,912 | A | 9/1997 | Keller |
| 5,740,295 | A | 4/1998 | Kinard et al. |
| 5,960,144 | A | 9/1999 | Klumps et al. |
| 5,970,196 | A | 10/1999 | Greveling et al. |
| 5,999,676 | A | 12/1999 | Hwang |
| 6,041,153 | A | 3/2000 | Yang |
| 6,137,935 | A | 10/2000 | Bohme et al. |
| 6,141,472 | A | 10/2000 | Ishikawa et al. |
| 6,198,865 | B1 | 3/2001 | Risch |
| 6,233,384 | B1 * | 5/2001 | Sowell et al. ................ 385/107 |
| 6,241,920 | B1 | 6/2001 | Cotter et al. |
| 6,249,629 | B1 | 6/2001 | Bringuier |
| 6,314,224 | B1 * | 11/2001 | Stevens et al. ................ 385/113 |
| 6,343,172 | B1 | 1/2002 | Schiestle et al. |
| 6,377,738 | B1 | 4/2002 | Anderson et al. |
| 6,430,344 | B1 | 8/2002 | Dixon et al. |
| 6,434,304 | B2 | 8/2002 | Gao et al. |
| 6,519,396 | B2 | 2/2003 | Schneider et al. |
| 6,618,526 | B2 | 9/2003 | Jackman et al. |
| 6,687,437 | B1 | 2/2004 | Starnes et al. |
| 6,738,547 | B2 | 5/2004 | Spooner |
| 6,785,452 | B2 | 8/2004 | Yasutomi |
| 7,113,680 | B2 | 9/2006 | Hurley et al. ................ 385/113 |
| 7,127,144 | B2 | 10/2006 | Lee |
| 7,289,704 | B1 | 10/2007 | Wagman et al. |
| 7,627,218 | B2 | 12/2009 | Hurley |
| 7,643,713 | B2 | 1/2010 | Buthe et al. |
| 7,778,510 | B2 | 8/2010 | Aronson et al. |
| 7,787,727 | B2 | 8/2010 | Bringuier et al. |
| 7,920,764 | B2 | 4/2011 | Kewitsch |
| 2002/0041743 | A1 | 4/2002 | Schneider et al. |
| 2002/0126967 | A1 | 9/2002 | Panak et al. |
| 2002/0141713 | A1 | 10/2002 | Okada et al. |
| 2002/0159727 | A1 | 10/2002 | Okada et al. |
| 2003/0023247 | A1 | 1/2003 | Lind et al. |
| 2003/0072545 | A1 | 4/2003 | Kusakari et al. |
| 2003/0118298 | A1 | 6/2003 | Matsuyama et al. |
| 2003/0165310 | A1 | 9/2003 | Moon et al. |
| 2003/0235379 | A1 | 12/2003 | Lin |
| 2005/0017495 | A1 | 1/2005 | Arnold |
| 2006/0088251 | A1 | 4/2006 | Wang et al. |
| 2006/0291787 | A1 | 12/2006 | Seddon |
| 2008/0037941 | A1 | 2/2008 | Mallya et al. |
| 2008/0037942 | A1 | 2/2008 | Tatat |
| 2010/0008631 | A1 | 1/2010 | Herbst |
| 2010/0209058 | A1 | 8/2010 | Ott |
| 2010/0316340 | A1 | 12/2010 | Sales Casals et al. |
| 2010/0329614 | A1 | 12/2010 | Keller et al. |
| 2011/0083898 | A1 | 4/2011 | Miller, III |
| 2011/0229097 | A1 | 9/2011 | Roberts et al. ................ 385/101 |
| 2012/0301090 | A1 | 11/2012 | Cline et al. |
| 2012/0328253 | A1 | 12/2012 | Hurley et al. |
| 2013/0188916 | A1 | 7/2013 | Bradley et al. ................ 385/113 |

FOREIGN PATENT DOCUMENTS

| | | | |
|---|---|---|---|
| DE | 29716946 U1 | 1/1999 | |
| EP | 0676654 A2 | 10/1995 | |
| EP | 0945876 A1 | 9/1999 | |
| EP | 0767754 B1 | 7/2000 | |
| EP | 1061394 B1 | 12/2000 | ............... G02B 6/44 |
| FR | 2555764 A1 | 5/1985 | |
| GB | 2233788 A | 1/1991 | |
| JP | 0320704 A | 1/1991 | |
| JP | 0352529 A | 3/1991 | |
| JP | 07174949 A | 7/1995 | |
| JP | 09152529 A | 6/1997 | |
| JP | 11160594 A | 6/1999 | |
| JP | 2000276955 A | 10/2000 | |
| WO | WO 92/01962 | 2/1992 | ............... G02B 6/44 |
| WO | 0198810 A1 | 12/2001 | |

OTHER PUBLICATIONS

Notice of Allowance for U.S. Appl. No. 13/559,102 mailed Sep. 27, 2013, 10 pages.

U.S. Appl. No. 13/596,256, Register et al., filed Aug. 28, 2012, 38 pages.

Patent Cooperation Treaty International Search Report, Application No. PCT/US2012/040856, Aug. 31, 2012, 4 pages.

* cited by examiner

US 8,693,831 B2

FIBER OPTIC CABLES ALLOWING FIBER TRANSLATION TO REDUCE BEND ATTENUATION

RELATED APPLICATIONS

This application claims the benefit of priority under 35 U.S.C. §119 of U.S. Provisional Application Ser. Nos. 61/588,950 filed Jan. 20, 2012, and 61/495,732 filed Jun. 10, 2011, the contents of which are relied upon and incorporated herein by reference in their entireties. This application is related to U.S. Provisional Application No. 61/315,492, filed Mar. 19, 2010; U.S. application Ser. No. 12/049,394, filed Mar. 16, 2011; International Application No. PCT/US11/34309, filed Apr. 28, 2011; and U.S. Provisional Application No. 61/416,684, filed Nov. 23, 2010.

BACKGROUND

1. Technical Field

The present disclosure generally relates to fiber optic cables having cavities or channels that allow optical fibers to translate during bending to reduce bend-induced attenuation.

2. Technical Background

As the use of fiber optics migrates into numerous consumer electronics applications, such as connecting computer peripherals, there will be a consumer-driven expectation for cables having improved performance and a broad range of use. For example, it is likely that consumer demand will be for a fiber optic cable having a small footprint (e.g. a cable outer diameter less than 3.0 millimeters (mm)) while at the same being flexible enough to "bend back" upon itself.

However, optical performance and optical fiber integrity are adversely affected by cable "bend back." FIG. 1 shows a typical fiber optic cable in a bent back configuration. The fiber optic cable 2 is generally circular and has an outer bend periphery 16 and a cable diameter or thickness 6. Internal to the cable is an optical fiber 10, which carries data. When the fiber optic cable 2 is bent back as shown, a bend radius 8 is at a minimum and is approximately equal to the cable diameter 6. The location of the optical fiber 10 within the cable 2 will affect a bend radius 12 of the optical fiber 10. If the optical fiber 10 is close to the outer bend periphery 16, the fiber will have a larger bend radius and experience lower attenuation. If the optical fiber 10 is closer to the inner portion of the cable, the bend radius of the fiber will be smaller and cause greater delta attenuation due bending. If the bend radius 12 is small enough, the optical fiber may crack at an outer surface 18 of the optical fiber 10 and cause cracking or fracture of the optical fiber 10.

SUMMARY

According to one aspect, a fiber optic cable comprises a polymer jacket having a channel therein, at least one optical fiber in the channel, a first electrical conductor on a first side of the channel, and a second electrical conductor located on an opposite side of the channel to the first conductor, wherein the channel has an aspect ratio calculated by dividing a height of the channel by a width of the channel of at least 1.5.

BRIEF DESCRIPTION OF THE DRAWINGS

The components of the following figures are illustrated to emphasize the general principles of the present disclosure and are not necessarily drawn to scale. Reference characters designating corresponding components are repeated as necessary throughout the figures for the sake of consistency and clarity.

DETAILED DESCRIPTION

Figure 1:
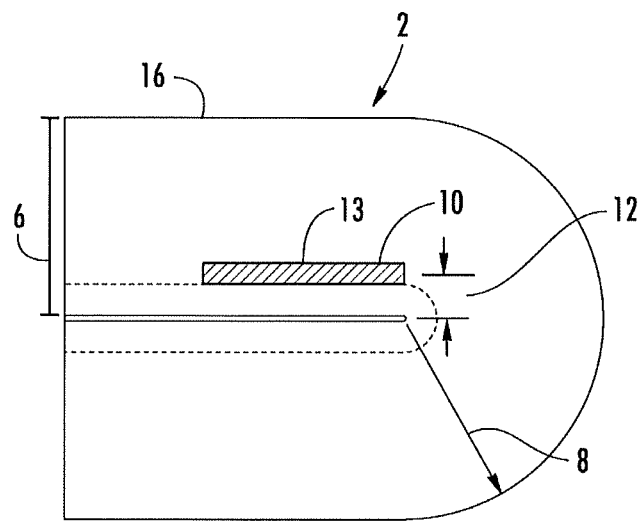
FIG. 1 is a cross-sectional view of a typical prior art fiber optic cable in a bent back configuration, wherein the cross-section is parallel to a length of the cable.
Figure 2:
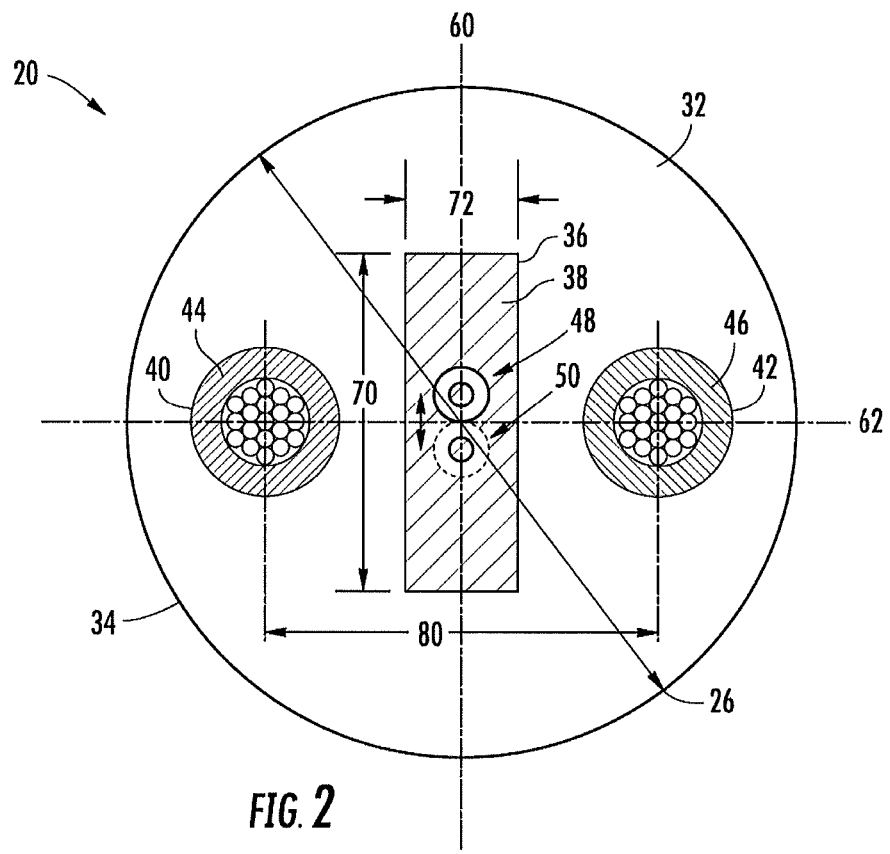
FIG. 2 is a cross-sectional view of a fiber optic cable according to a first embodiment of this disclosure, wherein the cross-section is a transverse cross-section perpendicular to a length of the cable.

FIG. 2 is a cross-sectional view of a fiber optic cable 20 according to a first embodiment of this disclosure. The cable 20 includes a polymer jacket 32 having an outer periphery 34 and a channel periphery 36 that defines a channel 38. In the illustrated embodiment, the cross-section of the cable 20 is generally circular with an outside diameter 26 of about 3.0 millimeters (mm). In this specification, it is understood that circular cables may have somewhat irregular cross-sections and varying degrees of ovality and/or deviation from an exact circular cross-section. Accordingly, references to "diameters" and "radii" of circular cables refer to median or average values, and do not require a "circular" cross-section to have a perfect circular geometry. In this specification, the terms "polymer" and "polymeric" indicate materials comprised primarily of polymers, but allow for the inclusion of non-polymer additives and other materials, such as fire-retardant compounds, etc., and the inclusion of multiple polymers in a blend.

The polymer jacket 32 encloses the channel 38 and the channel 38 may extend the entire length of the cable 20. The cable 20 further includes a pair of metallic electrical conductors 40, 42 that supply power to peripheral electrical equipment. The electrical conductors 40, 42 can in addition or alternatively carry data. The electrical conductors 40, 42 may include insulating material 44, 46, respectively, about the metallic conducting portions. Alternatively, because the conductors are embedded in the jacket 32, the insulating layers can be omitted. Data-carrying optical fibers 48, 50 are arranged in the channel 38. The optical fibers 48, 50 may be surrounded by buffer layers. Additional conductors can be wholly or partially embedded within the jacket 32. The conductors 40, 42 are stranded conductors which provide tensile strength to the cable while retaining good flexibility so that the cable 20 is relatively easy to bend. The electrical conductors 40, 42 also reduce plastic creep in the cable 20 caused by compressive loads.

The shape of the channel 38 is selected to allow the optical fibers 48, 50 to translate within the channel 38 when the cable 20 is bent. As shown in FIG. 2, the cable 20 cross-section can be bisected by a first axis 60 and by a second axis 62, the first and second axes being perpendicular to one another. The channel 38 has a height or length 70, that is generally measured along the first axis 60, and a width 72, that is generally measured along the second axis 62. The channel height 70 is greater than the channel width 72, so that the optical fibers 48, 50 have more freedom to move along the first axis 60.

The shape of the channel 38 and the locations of the electrical conductors 40, 42 provide some degree of a preferential bend characteristic to the cable 20 to bend either about the first axis 60 or the second axis 62, as well as allowing the optical fibers 48, 50 to translate to locations to increase their bend radius and reduce optical attenuation. Regarding preferential bend, locations of the electrical conductors 40, 42 along the second axis 62 provide an increased material moment of inertia along the second axis 62. The cable 20 is therefore inclined to twist when subjected to bend stresses so that it bends about the second axis 62, which can have the highest material moment of inertia of any axis through the cable 20. The height 72 of the channel 38 provides a path along which the optical fibers 48, 50 can move, as indicated by the double-headed arrow, so as to minimize bend stresses on the fibers as the cable is bent about the axis 62. When subjected to bending stresses, the cable 20 will tend to bend about the second axis 62, and the optical fibers 48, 50 will tend to move in the channel 38 to assume a state of lower strain.

Figure 3:
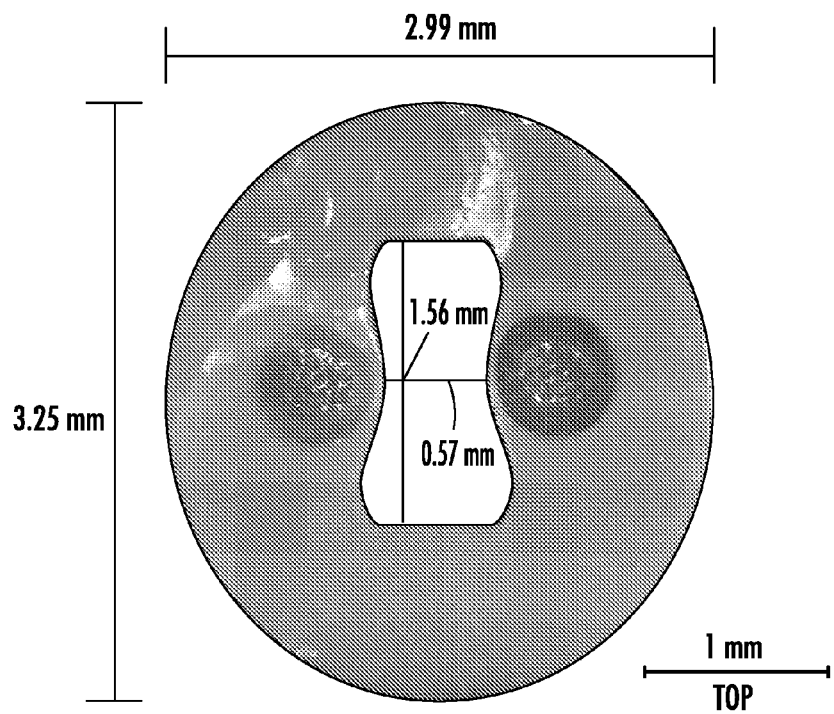
FIG. 3 is photograph of a cable cross-section according to an embodiment of this disclosure.

The rectangular cross-section shape of the channel 38 as shown in FIG. 2 is idealized in that it is difficult obtain precise geometrical shapes while extruding polymers. FIG. 3 is a photograph of a cable cross-section with a generally rectangular channel, but having slight convexity in the vicinity of the electrical conductors. The use of the terms "height" and "width" in this specification are therefore intended to allow for variations in the height and width dimensions along the channel cross-section. For example, the height 70 can be an average or median height of the channel 38, based on a plurality of measurements along the second axis 62. Likewise, the width 72 can be an average or median width of the channel 38 based on a plurality of measurements along the first axis 60.

The cross-sectional shape of the channel 38 can be characterized by the aspect ratio of the channel, obtained by dividing the height 70 by the width 72. Average or median height and width values can be used to obtain the aspect ratio. According to one aspect of the present embodiment, the aspect ratio is at least 1.5. In the illustrated embodiment, the aspect ratio is at least 2.0, and falls in the range of 2.25-5.0. The electrical conductors 40, 42 are arranged on opposite sides of the channel 38 and can be aligned with the second axis 62. The electrical conductors 40, 42 can have geometric centers having a spacing 80 along the second axis 62. The spacing 80 can be in the range of 0.45-0.8 times the diameter 26 of the cable 20. It is understood that the "alignment" of the conductors 40, 42 on the axis 62 does not require the geometric centers of the conductors to exactly coincide with the second axis 62. To be in alignment, the geometric centers of the conductors may be within, for example, a distance from the second axis 62 that is less than 10% of the cable diameter 26. The long dimension of the channel 38, or channel height, can be at least 45% of the outside diameter 26. The optical fibers 48, 50 can be relatively loosely disposed within the channel 38, so that they can translate a significant distance along the height dimension 70. For example, the fibers 48, 50 can be arranged so that they can each translate a distance of at least 10% of the cable diameter 26.

EXAMPLE 1

Figure 4:
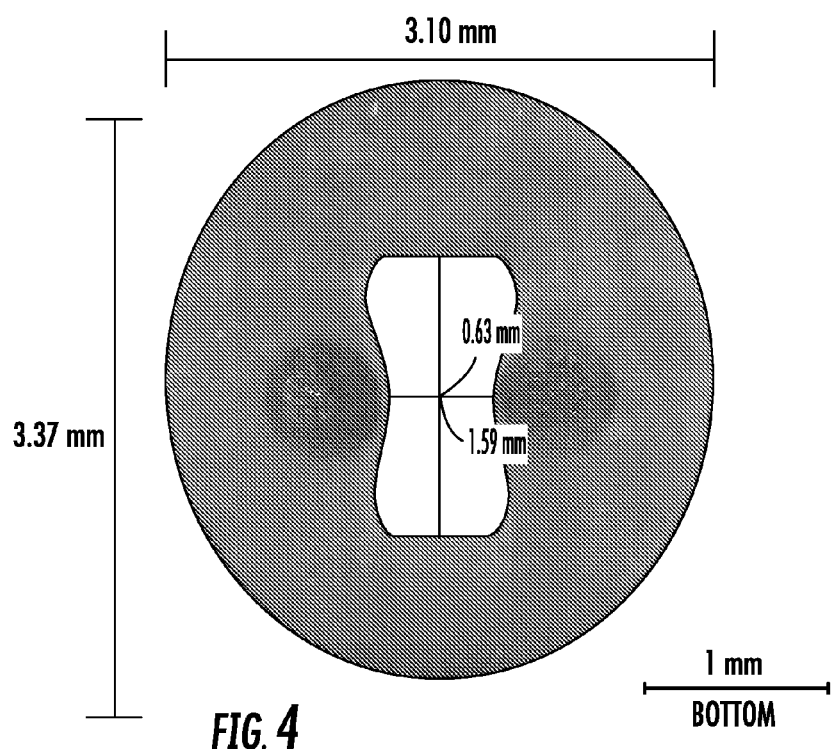
FIG. 4 is photograph of a cable cross-section according to an embodiment of this disclosure.

An exemplary cable 20 may have a cross-section as schematically shown in FIG. 2 and as in the photographs shown in FIGS. 3 and 4. The cable 20 includes two, 253 micron colored optical fibers. The cable has an average diameter 26 in the range of 2.8-3.3 mm, a channel 38 average height 70 in the range of 1.4-1.8 mm, an average width 72 in the range of 0.45-0.7 mm, and two insulated metallic electrical conductors in the range of 24 to 30 AWG (American wire gauge). The conductors 40, 42 are embedded in the cable jacket 32 during extrusion of the jacket. The aspect ratio for the channel 38 is in the range of 1.5-4. The electrical conductors 40, 42 are located on opposite sides of the channel 38, and their geometric centers are spaced from one another a distance in the range of 1.5-2.0 mm. The cable jacket 32 is comprised primarily of polyvinylchloride (PVC).

EXAMPLE 2

An exemplary cable 20 may have a cross-section as generally shown in FIG. 2. The cable 20 includes two colored optical fibers. The cable has an average diameter 26 in the range of 3.0-3.6 mm, a channel 38 average height 70 in the range of 1.4-1.8 mm, an average width 72 in the range of 0.45-0.7 mm, and two insulated metallic electrical conductors in the range of 24 to 30 AWG. The conductors 40, 42 are embedded in the cable jacket 32 during extrusion of the jacket. The aspect ratio for the channel 38 is in the range of 1.5-4. The electrical conductors 40, 42 are located on opposite sides of the channel 38, and their geometric centers are spaced from one another a distance in the range of 1.5-2.0 mm. The cable jacket 32 is comprised primarily of PVC.

EXAMPLE 3

An exemplary cable 20 may have a cross-section as generally shown in FIG. 2. The cable 20 includes a single colored optical fiber. The cable has an average diameter 26 in the range of 2.8-3.6 mm, a channel 38 average height 70 in the range of 1.4-1.8 mm, an average width 72 in the range of 0.3-0.6 mm, and two insulated metallic electrical conductors in the range of 24 to 30 AWG. The conductors 40, 42 are embedded in the cable jacket 32 during extrusion of the jacket. The aspect ratio for the channel 38 is in the range of 1.5-4. The electrical conductors 40, 42 are located on opposite sides of the channel 38, and their geometric centers are spaced from one another a distance in the range of 1.5-2.0 mm. The cable jacket 32 is comprised primarily of PVC.

EXAMPLE 4

An exemplary cable 20 may have a cross-section as generally shown in FIG. 2. The cable 20 includes four colored optical fibers. The cable has an average diameter 26 in the range of 2.8-3.6 mm, a channel 38 average height 70 in the range of 1.4-1.8 mm, an average width 72 in the range of 0.5-0.8 mm, and two insulated metallic electrical conductors in the range of 24 to 30 AWG (American wire gauge). The conductors 40, 42 are embedded in the cable jacket 32 during extrusion of the jacket. The aspect ratio for the channel 38 is in the range of 1.5-4. The electrical conductors 40, 42 are located on opposite sides of the channel 38, and their geometric centers are spaced from one another a distance in the range of 1.5-2.0 mm. The cable jacket 32 is comprised primarily of PVC.

In the embodiments shown in FIGS. 2-4, the cables 20 can consist essentially of the conductors 40, 42, insulated or not insulated, the cable jacket 32, buffered or non-buffered optical fibers, and, if desired strength elements (not illustrated) such as tensile yarns. The periphery 34 of the jacket 32 can constitute the exterior of the cable 20 with no additional jacketing or covering layers.

Figure 5:
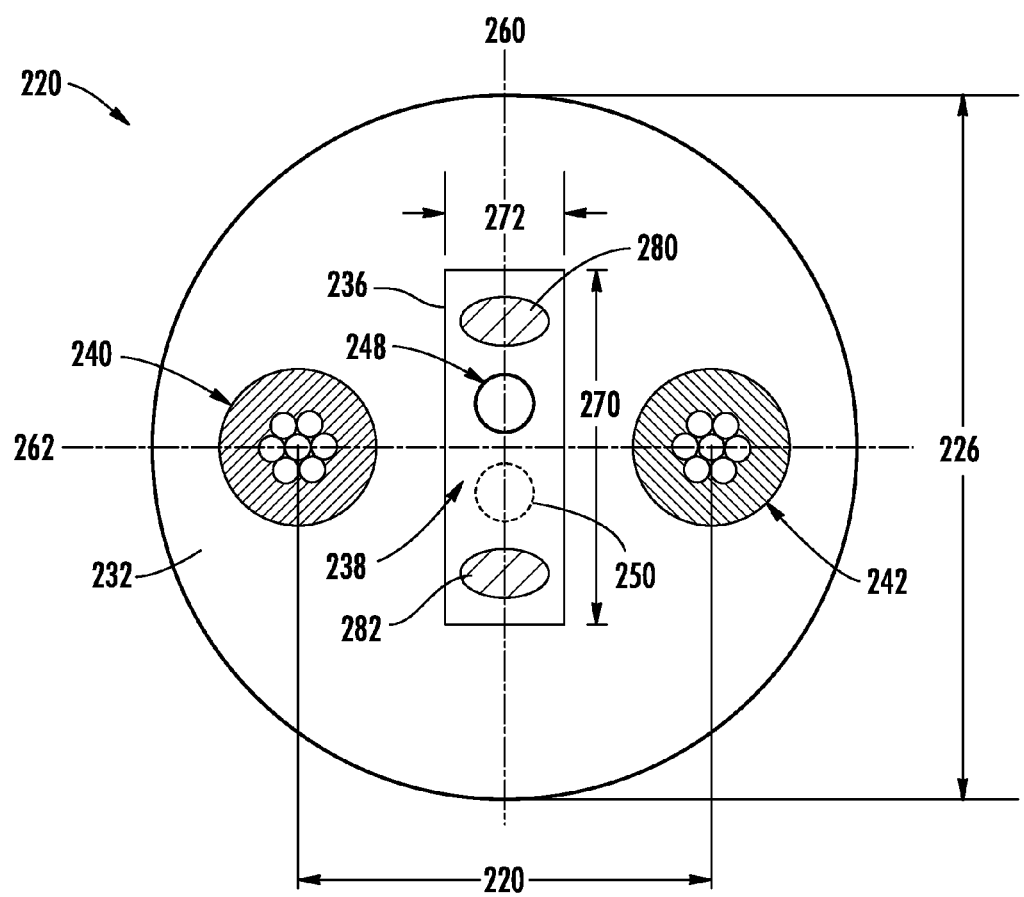
FIG. 5 is a cross-sectional view of a fiber optic cable according to a second embodiment of this disclosure, wherein the cross-section is a transverse cross-section perpendicular to a length of the cable.
Figure 6:
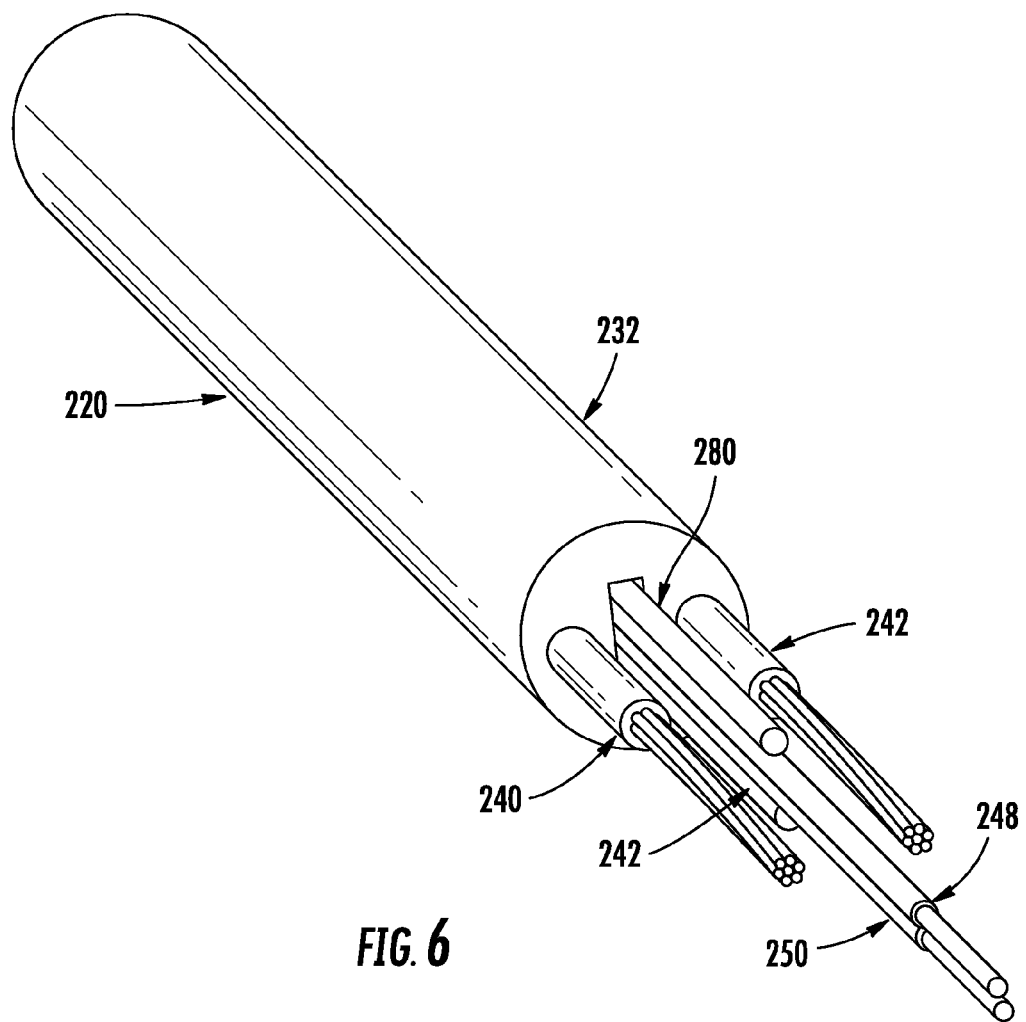
FIG. 6 is an exploded perspective view of the cable of FIG. 5.

FIG. 5 illustrates a cross-sectional view of a cable 220 according to another embodiment. FIG. 6 is an exploded perspective view of the cable 220. The cable 220 includes a polymer jacket 232 having an outer periphery 234 and a channel periphery 236 with the channel periphery 236 defining a channel 238. In the illustrated embodiment, the cross-section of the cable 220 is generally circular with an average diameter 226 of about 3.0 millimeters (mm). The polymer jacket 232 encloses the channel 238 and the channel 238 may extend the entire length of the cable 220. The cable 220 further includes a pair of insulated metallic electrical conductors 240, 242. Data-carrying optical fibers 248, 250 are also included within the channel 238. The shape of the channel 238 is selected to allow the optical fibers 248, 250 to translate when the cable 220 is bent. As shown in FIG. 5, the cable 220 cross-section can be bisected by a first axis 260 and by a second axis 262, the first and second axes being perpendicular to one another. The channel 238 has a height or length 270, and a width 272, where the height 270 is greater than the channel width 272 so that the optical fibers 248, 250 have more freedom to move along the first axis 260.

Figure 7:
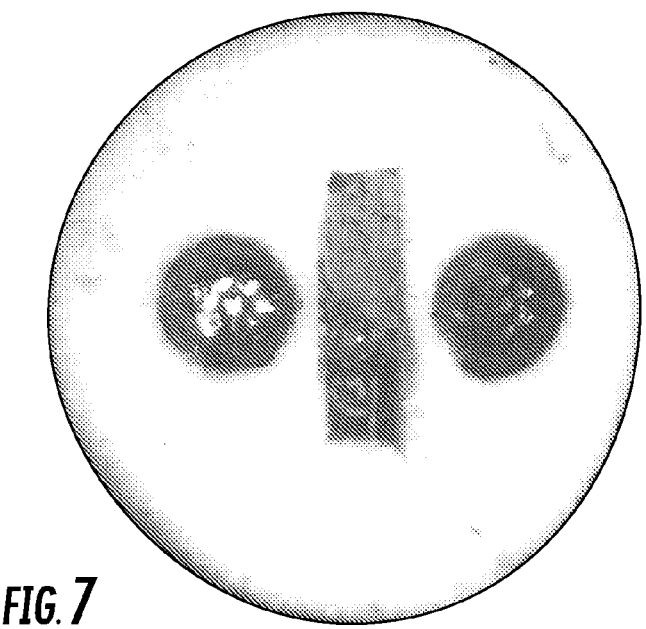
FIG. 7 is photograph of a cable cross-section according to an embodiment of this disclosure.

The cable 220 also includes one or more tensile strength members in the channel 238. The tensile strength members are shown in FIGS. 5 and 6 as two discrete elements, numbered 280 and 282. The tensile strength members can, however, comprise loosely packed tensile yarns that are essentially distributed in the channel 238 in a nonuniform manner. The tensile strength members can be formed from tensile yarns, including aramid yarns. The strength members can provide tensile strength to the cable, as well as providing coupling of the optical fibers 248, 250 to the jacket 232. FIG. 7 is a photograph of a cross-section of a cable corresponding generally to the cross-section in FIG. 5. The tensile yarns shown in the photograph are nonuniformly distributed in the channel. The strength material 280, 282 is loosely packed enough such that it allows the optical fibers to move within the channel 238.

In the illustrated embodiment, the values and ranges discussed with reference to the cable cross-section shown in FIG. 2 for cable diameter, channel width, channel height, conductor spacing, and aspect ratio are all applicable to the cable shown in FIGS. 5-7.

EXAMPLE 5

An exemplary cable having a cross-section as shown in FIG. 5 has an average diameter in the range of 2.8-3.3 mm, a channel having an average height in the range of 1.4-1.8 mm, an average width in the range of 0.45-0.7 mm, and two insulated electrical conductors in the range of 24 to 30 AWG. The conductors are embedded in the cable jacket during extrusion of the jacket. The aspect ratio for the channel is in the range of 2.5-3.5. The electrical conductors are located on opposite sides of the channel, and their centerlines are spaced from one another a distance in the range of 1.6-1.9 mm. The cable jacket is comprised of copolymer thermoplastic elastomer (TPE). The cable 20 includes two colored optical fibers. KEVLAR™ aramid yarns are provided in the channel.

Figure 8:
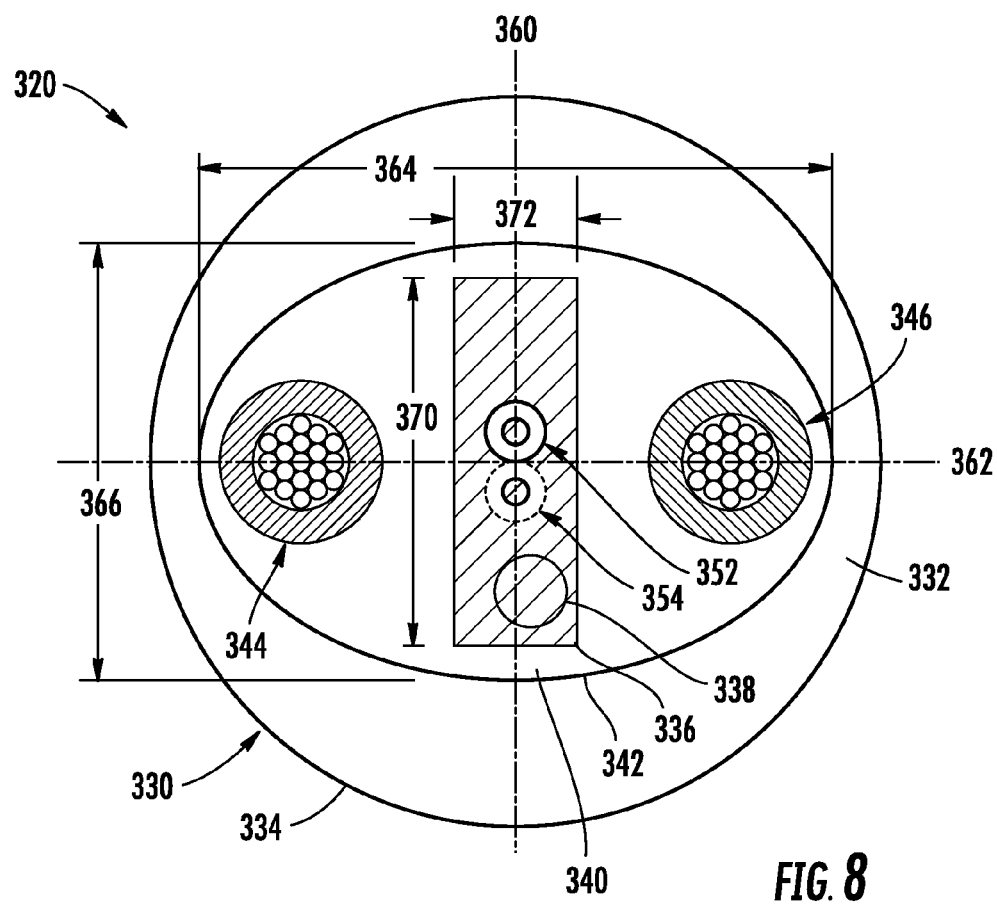
FIG. 8 is a transverse cross-sectional view of a fiber optic cable according to a third embodiment of this disclosure.
Figure 9:
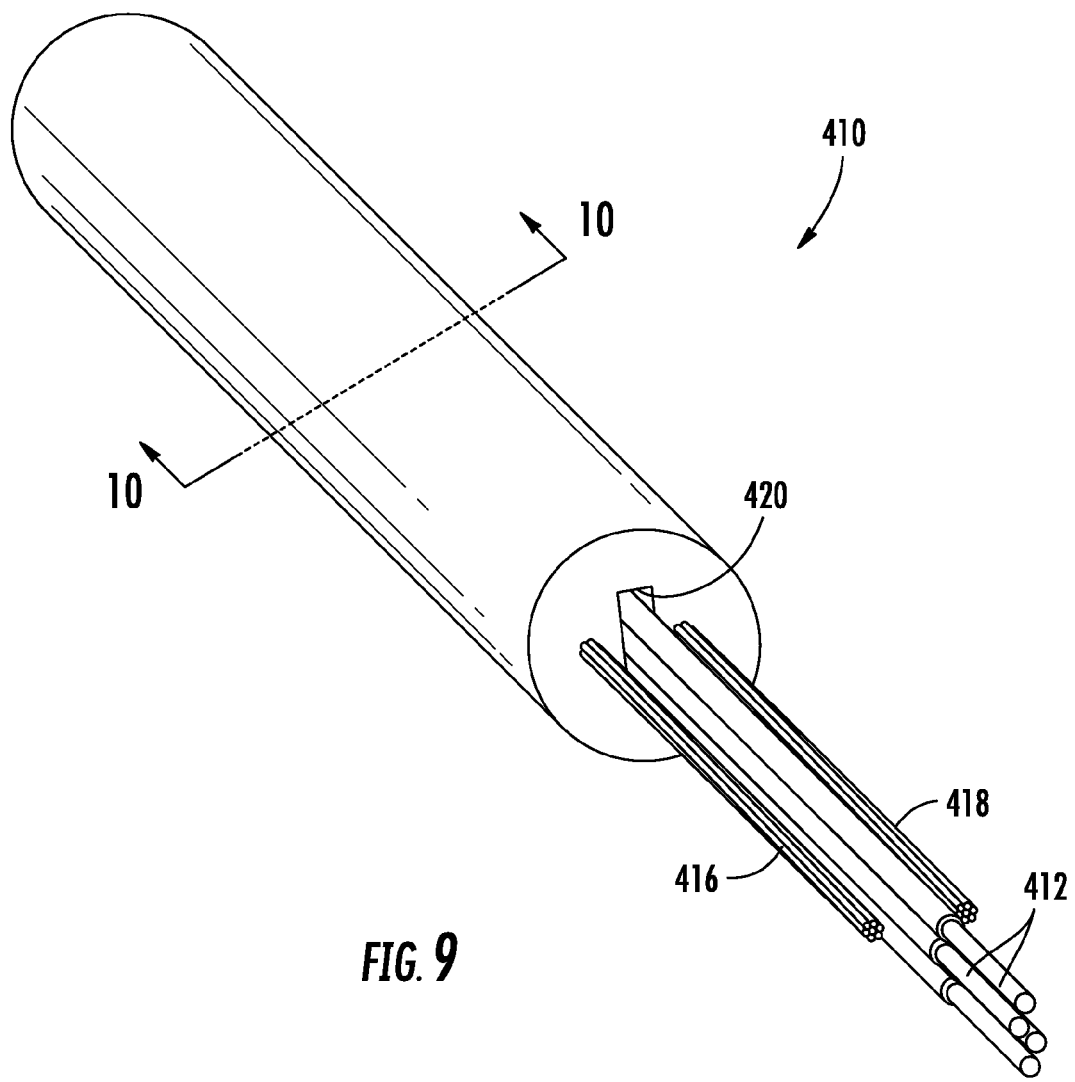
FIG. 9 is a perspective view of a cable according to an exemplary embodiment.
Figure 10:
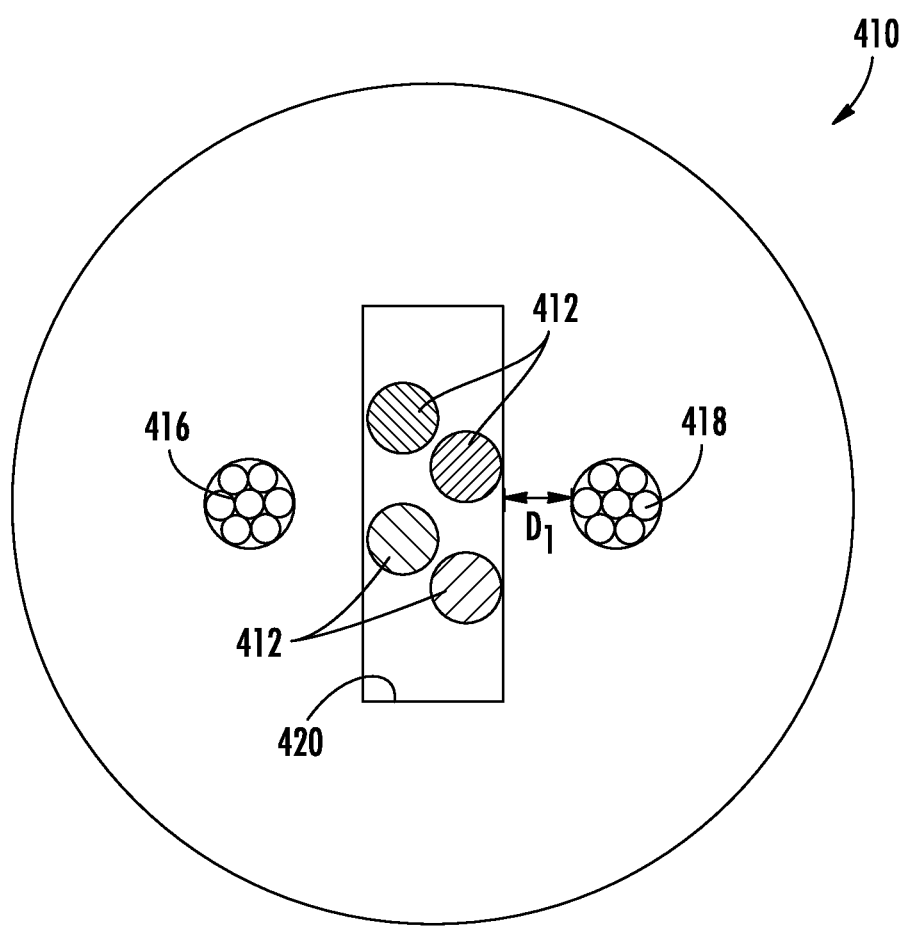
FIG. 10 is a section view of the cable of FIG. 9 taken along line 10-10 as shown in FIG. 9.

FIG. 8 is a cross-sectional view of a fiber optic cable 320 according to another embodiment of this disclosure. The cable 320 includes a polymer jacket 330 having an outer section 332 formed from a first polymeric material, with a periphery 334, and an inner section 340, formed from a second polymeric material, disposed within the outer portion 332. The inner section 340 can be formed from a polymer that is coextruded with the outer portion 332. The interior of the jacket 332 is accordingly in direct contact with an outer periphery 342 of the inner section 340, completely enclosing the inner section. According to one aspect of the present embodiment, the inner section 340 can have a modulus of elasticity that is greater than the outer section 332.

A channel periphery 336 defines a channel 338 in the inner section 340. In the illustrated embodiment, the cross-section of the cable 320 is generally circular with a diameter of about 3.0 mm. The channel 338 may extend the entire length of the cable 320. The cable 320 further includes a pair of insulated metallic electrical conductors 344, 346 that supply power to peripheral electrical equipment. The electrical conductors 344, 346 can in addition or alternatively carry data. The electrical conductors 344, 346 can be embedded in the jacket 332 so that insulating material can be omitted. Data-carrying optical fibers 352, 354 are also included within the channel 338. The optical fibers 352, 354 may be surrounded by colored buffer layers.

As shown in FIG. 8, the cable 320 cross-section can be bisected by a first axis 360 and by a second axis 362, the first and second axes being perpendicular to one another. The inner section 340 has a width, or major dimension 364, that is measured along the second axis 362. A minor dimension 366 or height of the inner section 340 is measured along the first axis 360. The inner section 340 has a curved outer periphery 342 and the minor dimension 366 is smaller than the major dimension 364, so that it resembles an ellipse. The shape of the channel 338 is selected to allow the optical fibers 352, 354 to translate within the channel 338 when the cable 320 is bent. The channel 338 has a height or length 370, that is generally measured along the first axis 360, and a width 372, that is generally measured along the second axis 362. The channel height 370 is greater than the channel width 372, so that the optical fibers 352, 354 have more freedom to move along the first axis 360. The shape of the channel 338 and the locations of the electrical conductors 344, 346 provide preferential bend characteristics to the cable 320 to bend either about the first axis 360 or the second axis 362, as well as allowing the optical fibers 352, 354 to translate to locations to increase their bend radius and reduce optical attenuation. By forming the jacket 330 from a relatively low modulus outer section 332 and a relatively high modulus inner section 340, the stability of the channel 338 is improved.

According to one aspect, the low modulus outer section 332 reduces torsional forces in bending. The high modulus inner section 340 adds strength to the side walls of the channel 338 and resists torsional forces. Use of low modulus material in the outer section 332 also helps improve the flexibility in handling of the cable 320 as compared to a cable having a uniform high modulus jacket. The inner core may also be independent of the outer jacket.

Examples of high modulus materials suitable for use in the inner section 340 are high modulus polyvinylchloride (PVC), thermoplastic elastomer (TPE), nylon, and polyethylene. Examples of low modulus materials suitable for use in the outer section 332 are low modulus PVC, TPE, and thermoplastic urethane (TPU). The inner section 340 can have a modulus of elasticity that is at least 100% higher than that of the outer section 332. The polymer of the inner section 340 has a cross-sectional area that is at least 20% of the total cross-sectional area of the cable 320 cross-section.

The values and ranges discussed with reference to the cable cross-section shown in FIG. 2 for cable diameter, channel width, channel height, conductor spacing, and aspect ratio are all applicable to the cable shown in FIG. 8.

EXAMPLE 6

A cable 320 as shown in FIG. 8 has a diameter in the range of 2.8-3.2 mm and two electrical conductors in the range of 24-28 AWG. The cable jacket 330 has an inner section 340 with a modulus of elasticity that is at least twice as large as the modulus of elasticity of the outer section 332.

Figure 11:
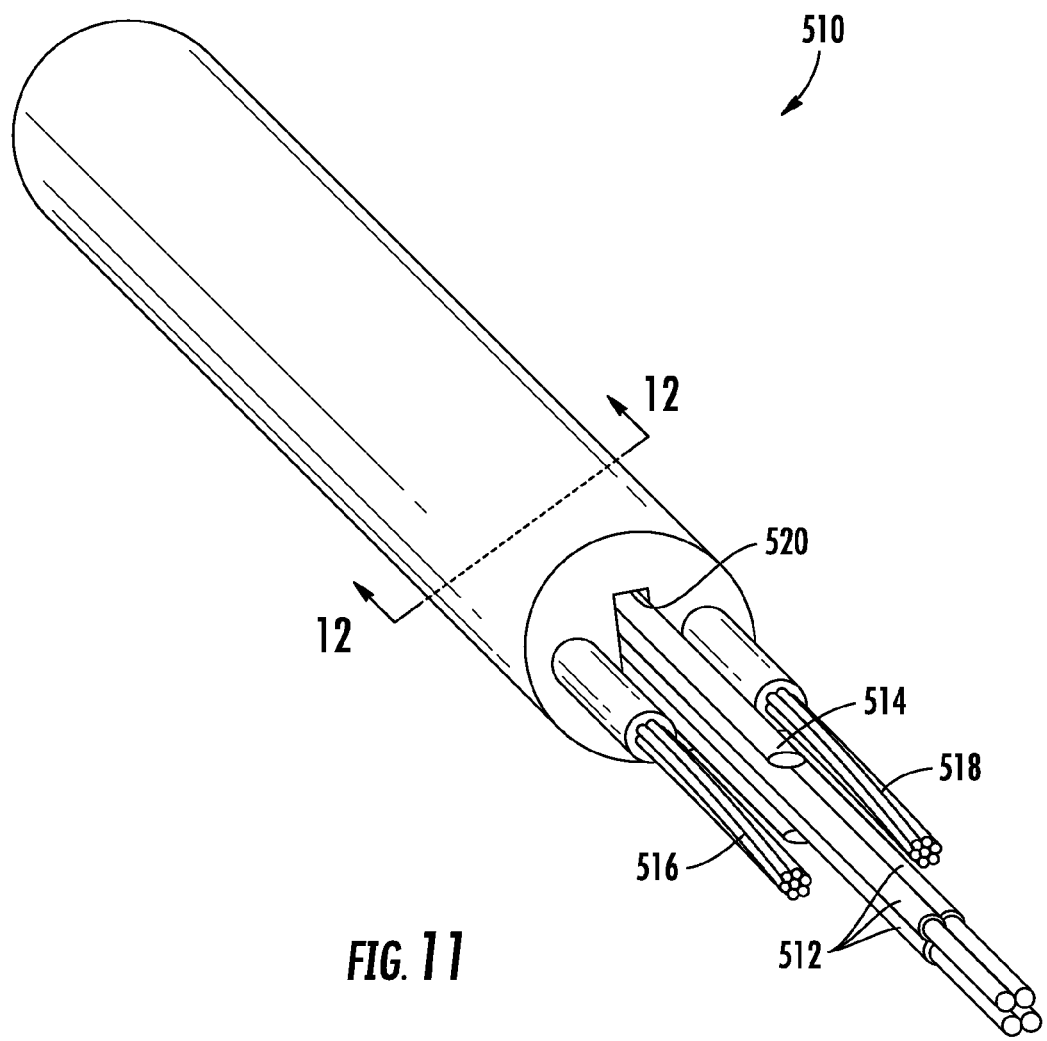
FIG. 11 is a perspective view of a cable according to another exemplary embodiment.
Figure 12:
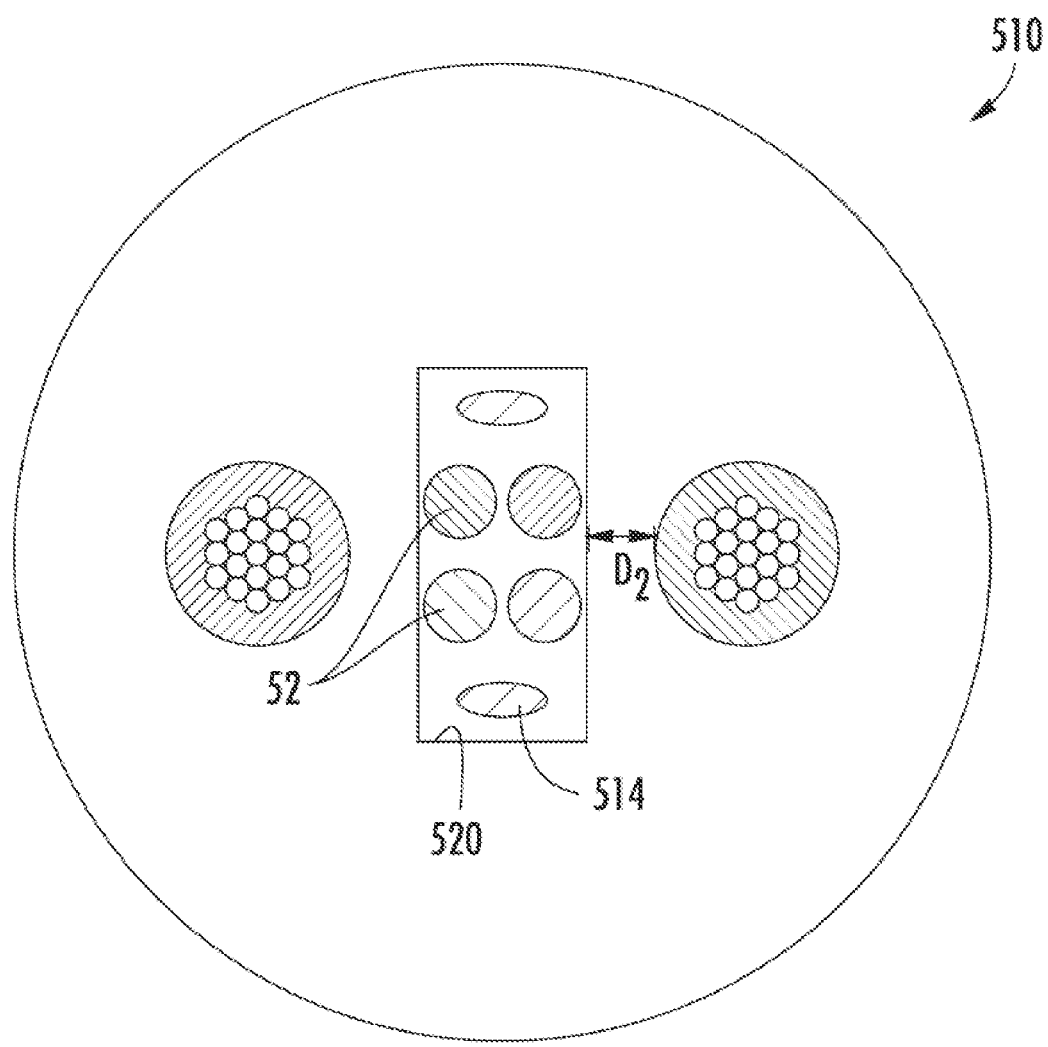
FIG. 12 is a section view of the cable of FIG. 11 taken along line 12-12 as shown in FIG. 11.

Referring to FIGS. 9-12, cables 410, 510 may include more than two data-carrying optical fibers 412, 512 such as four optical fibers per cable 410, 510, with or without tensile yarn 514 (FIGS. 11-12). Other numbers of optical fibers 412, 512 may be used as well, such as one multi-mode optical fiber, twelve single-mode optical fibers, or different numbers and types of optical fibers including a glass core and cladding.

In some embodiments, the conductors 416, 418, 516, 518 (e.g., strength members, reinforcement structures, bend-control elements) are conductive (i.e., made from electrically conductive material) but are not intended to or do not actively conduct electricity or supply power to peripheral electrical equipment during operation of associated hardware. Such conductors 416, 418, 516, 518 may still serve to provide strength to the cable 410, 510 and/or to provide a bend preference to the cable 410, 510 so that the optical fibers 412, 512 generally move in the longer dimension of the channel 420, 520 when the cable 410, 510 is bent or wound. In some such embodiments, the conductors 416, 418, 516, 518 may be decoupled or isolated electrically in connector(s) attached on end(s) of the cable 410, 510 and/or elsewhere, so as to prevent or block active electrical conduction via the conductors 416, 418, 516, 518 between the associated hardware. In other embodiments, one of the conductors 416, 418, 516, 518 may actively conduct electricity or electrical communications, while the other is conductive but decoupled electrically from associated hardware. In such an arrangement, the conductors 416, 418, 516, 518 offset one another structurally and geometrically, providing bend preference and strength to the cable 410, 510, but only one of the conductors 416, 418, 516, 518 actively communicates electrically during operation of the associate hardware.

In contemplated embodiments, different numbers of conductors 416, 418, 516, 518 may be used, such as three or four conductors arranged along the same axis, to control bending and to provide strength and/or conduits for electrical communication. In some embodiments, the conductors are metallic, such as comprising or consisting of copper, steel, stainless steel (e.g., stranded stainless steel wire, seven-strand stainless steel wire), aluminum, or other metals or alloys of such metals. For example, in some embodiments, copper may be used for conductors 416, 418, 516, 518 intended for data communication, while stainless steel may be used for conductors 416, 418, 516, 518 intended primarily for or only for strength and bend control. The stranding lay orientation (e.g., helical direction) of stranded conductors 416, 418, 516, 518 may be opposite to one another to offset one another and facilitate straight formation of the associated cable 410, 510.

In some embodiments, the diameter of the cable 410, 510 using steel conductors 416, 418, 516, 518 may be less than the diameter of a similar cable 410, 510 using copper conductors 416, 418, 516, 518 at least in part because of the associated strength differences of the materials. For example, a steel conductor 416, 418 may be in the range of 0.30 mm in diameter or less, while a copper conductor 516, 518 may be in the arrange of 0.38 mm. As such, the diameter of cable 410 using steel conductors 416, 418 with four optical fibers 412, 512 may be in the range of 2.9 to 3.5 mm. The channel 420, 520 may be in the range of 0.4 to 0.5 mm in width and 1.0 to 1.75 mm in height. According to an exemplary embodiment, the channel 420, 520 is oriented with the narrower direction (e.g., width) aligned with the axis extending between the centers of the conductors 416, 418, 516, 518 (where the conductors 416, 418, 516, 518 may not be intended to actively conduct electricity during operation of associated hardware). The interior of the channel 420, 520 may be spaced apart from the conductors 416, 418, 516, 518 by a distance $D_1$, $D_2$ of at least 0.15 mm, such as about 0.2 mm, providing sufficient separation to prevent pinching or other direct- or indirect-interaction that would attenuate, damage, and/or otherwise influence the optical fibers 412, 512, between the conductors 416, 418, 516, 518 when the cable 410, 510 is bent.

In other contemplated embodiments, non-conductive materials—such as ceramic, plastic, glass-reinforced plastic, or other non-conductive materials—may be used to provide strength and bend control in place of the conductors 416, 418, 516, 518. Such non-conductive members may be shaped and positioned similarly to the conductors 416, 418, 516, 518, but dimensions of the non-conductive members may be greater due to differences in the respective material properties. For example, steel conductors 416, 418 may be preferred over glass-reinforced strength elements because the steel conductors 416, 418, may allow for a smaller cable 410 cross-section (i.e., area of a face transverse to the length of the cable 410), or a cross-section appropriate for a particular use of the cable 410.

Throughout the foregoing disclosure, the adjective "about" has been used in numerous locations preceding an amount. Other embodiments of this disclosure are like the above-discussed embodiments, except that the adjective "about" is optional and may be omitted. It will be understood to the skilled artisan that the methods disclosed herein to control optical fiber position within a fiber optic cable are not mutually exclusive and may be used in any combination as required to achieve appropriate control of optical fiber position.

The construction and arrangements of the cable, as shown in the various exemplary embodiments, are illustrative only. Although only a few embodiments have been described in detail in this disclosure, many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter described herein. For example, as will be understood by those of ordinary skill in the art, features and attributes associated with embodiments shown in one of the Figures may be applied to embodiments shown in others of the Figures. Also, some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A fiber optic cable configured for use in consumer electronics applications, including connecting computer peripherals, the fiber optic cable comprising:
    (A) colored optical fibers, each of the optical fibers comprising a glass core and cladding, wherein the optical fibers are non-buffered optical fibers;
    (B) a polymer jacket having an outer periphery and a channel periphery that defines a channel through which the optical fibers extend,
        wherein the channel extends the entire length of the cable,
        wherein the shape of the channel is selected to allow the optical fibers to translate therein when the cable is bent;
        wherein the cable cross-section can be bisected by a first axis and by a second axis, the first and second axes being perpendicular to one another, wherein the channel has a height that is generally measured along the first axis and a width that is generally measured along the second axis, wherein the height of the channel is greater than the width of the channel, wherein the optical fibers may move along the first axis;
        wherein the channel has an aspect ratio, obtained by dividing the height of the channel by the width of the channel, of at least 1.5;
        wherein the outer periphery of the jacket constitutes the exterior of the fiber optic cable;
        wherein the fiber optic cable is circular in cross-section;
        wherein the fiber optic cable has a particularly small footprint such that the diameter of the circular cross-section is about 3 millimeters;
    (C) first and second bend-control elements,
        wherein the bend-control elements provide a preferential bend characteristic to the fiber optic cable such that the fiber optic cable is inclined to twist when subjected to bending stresses so that the fiber optic cable bends about the second axis and the optical fibers will tend to move in the channel to assume a state of lower strain;
        wherein the bend control elements are arranged on opposite sides of the channel from one another and are aligned with the second axis,
        wherein the bend-control elements are wholly embedded in the jacket,
        wherein the bend control elements comprise electrically-conductive material and wherein the electrically-conductive material is metallic;
        wherein the bend control elements are spaced apart from the interior of the channel by a distance of at least 0.15 millimeters, thereby providing sufficient separation to mitigate pinching or other direct- or indirect-interaction that may attenuate, damage, or otherwise influence the optical fibers when the cable is bent.

2. The fiber optic cable of claim 1, wherein the electrically-conductive material is steel, and wherein the bend control elements are non-insulated in that the steel is embedded in the jacket without additional insulating material.

3. The fiber optic cable of claim 2, wherein the steel of the bend control elements is stranded, thereby providing tensile strength to the cable while retaining good flexibility so that the fiber optic cable is relatively easy to bend.

4. The fiber optic cable of claim 3, wherein the bend-control elements have a diameter that is in the range of about 0.3 millimeters or less, facilitating the particularly small footprint of the fiber optic cable.

5. The fiber optic cable of claim 1, wherein the fiber optic cable not merely comprises, but consists essentially of elements (A), (B), and (C).

6. The fiber optic cable of claim 5, wherein the diameter of the fiber optic cable is, more specifically, in the range of 2.9 to 3.5 millimeters.

7. The fiber optic cable of claim 6, wherein the optical fibers are precisely four optical fibers.

8. A fiber optic cable configured for use in consumer electronics applications, including connecting computer peripherals, the fiber optic cable comprising:
    (A) optical fibers, each of the optical fibers comprising a glass core and cladding, wherein the optical fibers are non-buffered optical fibers;
    (B) a polymer jacket having an outer periphery and a channel periphery that defines a channel through which the optical fibers extend,
        wherein the channel extends the entire length of the cable,
        wherein the shape of the channel is selected to allow the optical fibers to translate therein when the cable is bent;
        wherein the cable cross-section can be bisected by a first axis and by a second axis, the first and second axes being perpendicular to one another, wherein the channel has a height that is generally measured along the first axis and a width that is generally measured along the second axis, wherein the height of the channel is greater than the width of the channel, wherein the optical fibers may move along the first axis;
        wherein the channel has an aspect ratio, obtained by dividing the height of the channel by the width of the channel, of at least 1.5;
        wherein the outer periphery of the jacket constitutes the exterior of the fiber optic cable;
        wherein the fiber optic cable is circular in cross-section;
        wherein the fiber optic cable has a particularly small footprint such that the diameter of the circular cross-section is about 3 millimeters;
    (C) first and second bend-control elements,
        wherein the bend-control elements provide a preferential bend characteristic to the fiber optic cable such that the fiber optic cable is inclined to twist when subjected to bending stresses so that the fiber optic cable bends about the second axis and the optical fibers will tend to move in the channel to assume a state of lower strain;
        wherein the bend control elements are arranged on opposite sides of the channel from one another and are aligned with the second axis,
        wherein the bend-control elements are wholly embedded in the jacket,
        wherein the bend control elements comprise electrically-conductive material and wherein the electrically-conductive material is metallic;
        wherein the bend control elements are spaced apart from the interior of the channel by a distance of at least 0.15 millimeters, thereby providing sufficient separation to mitigate pinching or other direct- or indirect-interaction that may attenuate, damage, or otherwise influence the optical fibers when the cable is bent.

9. The fiber optic cable of claim 8, wherein the electrically-conductive material is steel, and wherein the bend control elements are non-insulated in that the steel is embedded in the jacket without additional insulating material.

10. The fiber optic cable of claim 9, wherein the steel of the bend control elements is stranded, thereby providing tensile strength to the cable while retaining good flexibility so that the fiber optic cable is relatively easy to bend.

11. The fiber optic cable of claim 10, wherein the bend-control elements have a diameter that is in the range of about 0.3 millimeters or less, facilitating the particularly small footprint of the fiber optic cable.

12. The fiber optic cable of claim 8, wherein the fiber optic cable not merely comprises, but consists essentially of elements (A), (B), and (C).

13. The fiber optic cable of claim 12, wherein the diameter of the fiber optic cable is, more specifically, in the range of 2.9 to 3.5 millimeters.

14. The fiber optic cable of claim 13, wherein the optical fibers are precisely four optical fibers.

15. A fiber optic cable configured for use in consumer electronics applications, including connecting computer peripherals, the fiber optic cable comprising:
(A) colored optical fibers, each of the optical fibers comprising a glass core and cladding;
(B) a polymer jacket having an outer periphery and a channel periphery that defines a channel through which the optical fibers extend,
wherein the channel extends the entire length of the cable,
wherein the shape of the channel is selected to allow the optical fibers to translate therein when the cable is bent;
wherein the cable cross-section can be bisected by a first axis and by a second axis, the first and second axes being perpendicular to one another, wherein the channel has a height that is generally measured along the first axis and a width that is generally measured along the second axis, wherein the height of the channel is greater than the width of the channel, wherein the optical fibers may move along the first axis;
wherein the channel has an aspect ratio, obtained by dividing the height of the channel by the width of the channel, of at least 1.5;
wherein the outer periphery of the jacket constitutes the exterior of the fiber optic cable;
wherein the fiber optic cable is circular in cross-section;
wherein the fiber optic cable has a particularly small footprint such that the diameter of the circular cross-section is in the range of 2.9 to 3.5 millimeters;
(C) first and second bend-control elements,
wherein the bend-control elements provide a preferential bend characteristic to the fiber optic cable such that the fiber optic cable is inclined to twist when subjected to bending stresses so that the fiber optic cable bends about the second axis and the optical fibers will tend to move in the channel to assume a state of lower strain;
wherein the bend control elements are arranged on opposite sides of the channel from one another and are aligned with the second axis,
wherein the bend-control elements are wholly embedded in the jacket,
wherein the bend control elements comprise electrically-conductive material and wherein the electrically-conductive material is metallic;
wherein the bend control elements are spaced apart from the interior of the channel by a distance of at least 0.15 millimeters, thereby providing sufficient separation to mitigate pinching or other direct- or indirect-interaction that may attenuate, damage, or otherwise influence the optical fibers when the cable is bent.

16. The fiber optic cable of claim 15, wherein the electrically-conductive material is steel, and wherein the bend control elements are non-insulated in that the steel is embedded in the jacket without additional insulating material.

17. The fiber optic cable of claim 16, wherein the steel of the bend control elements is stranded, thereby providing tensile strength to the cable while retaining good flexibility so that the fiber optic cable is relatively easy to bend.

18. The fiber optic cable of claim 17, wherein the bend-control elements have a diameter that is in the range of about 0.3 millimeters or less, facilitating the particularly small footprint of the fiber optic cable.

19. The fiber optic cable of claim 15, wherein the fiber optic cable not merely comprises, but consists essentially of elements (A), (B), and (C).

20. The fiber optic cable of claim 19, wherein the optical fibers are precisely four optical fibers.

\* \* \* \* \*